United States Patent
Mueller

(10) Patent No.: US 6,671,046 B2
(45) Date of Patent: Dec. 30, 2003

(54) POLARIZATION CONVERTER

(75) Inventor: Emmerich Mueller, Aidlingen (DE)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/093,237

(22) Filed: Mar. 7, 2002

(65) Prior Publication Data

US 2002/0176079 A1 Nov. 28, 2002

(30) Foreign Application Priority Data

May 22, 2001 (EP) .............................. 01112440

(51) Int. Cl.⁷ .................................... G01J 4/00
(52) U.S. Cl. ..................................... 356/364
(58) Field of Search ................. 356/364, 365, 356/366, 367, 368, 369

(56) References Cited

U.S. PATENT DOCUMENTS

| | | | | |
|---|---|---|---|---|
| 3,971,930 A | * | 7/1976 | Fitzmaurice et al. ........ | 359/156 |
| 5,102,222 A | | 4/1992 | Berger et al. ............... | 356/367 |
| 6,043,887 A | | 3/2000 | Allard et al. ............... | 356/364 |
| 6,075,647 A | | 6/2000 | Braun et al. ................ | 359/578 |
| 6,101,009 A | * | 8/2000 | Linke et al. ................. | 359/22 |
| 6,160,665 A | * | 12/2000 | Yuan .......................... | 359/629 |
| 6,166,838 A | * | 12/2000 | Liu et al. .................... | 359/128 |
| 6,519,060 B1 | * | 2/2003 | Liu ............................. | 359/127 |
| 6,545,783 B1 | * | 4/2003 | Wu et al. .................... | 359/127 |
| 2002/0071145 A1 | * | 6/2002 | Roh ............................ | 359/35 |
| 2002/0093662 A1 | * | 7/2002 | Chen et al. ................. | 356/491 |

FOREIGN PATENT DOCUMENTS

| | | |
|---|---|---|
| EP | 0 431 894 A2 | 6/1991 |
| EP | 0 489 375 A2 | 6/1992 |
| EP | 0 782 028 A1 | 7/1997 |
| WO | WO 01/13079 | 2/2001 |

\* cited by examiner

*Primary Examiner*—Michael P. Stafira
*Assistant Examiner*—Juan D Valentin

(57) ABSTRACT

An optical measuring unit for measuring an optical property of an incoming optical beam comprises a polarization converter receiving the incoming optical beam and providing a first output beam and a second output beam thereof, which are spatially separated and with substantially matching states of polarization. A polarization dependent analysis unit receives the first and the second output beams from the polarization converter, and measures the optical property of both the first and the second output beams. The polarization converter comprises a polarization dependent beam splitter splitting up an incoming optical beam into a first output beam of the polarization converter and into a second beam, each with a defined state of polarization but different from each other. polarization adapter receives the second beam and for provides the second output beam of the polarization converter, whereby the state of polarization of the second output beam substantially matches with the state of polarization of the first output beam. The first output beam and the second output beam are spatially separated from each other to avoid interference effects.

8 Claims, 1 Drawing Sheet

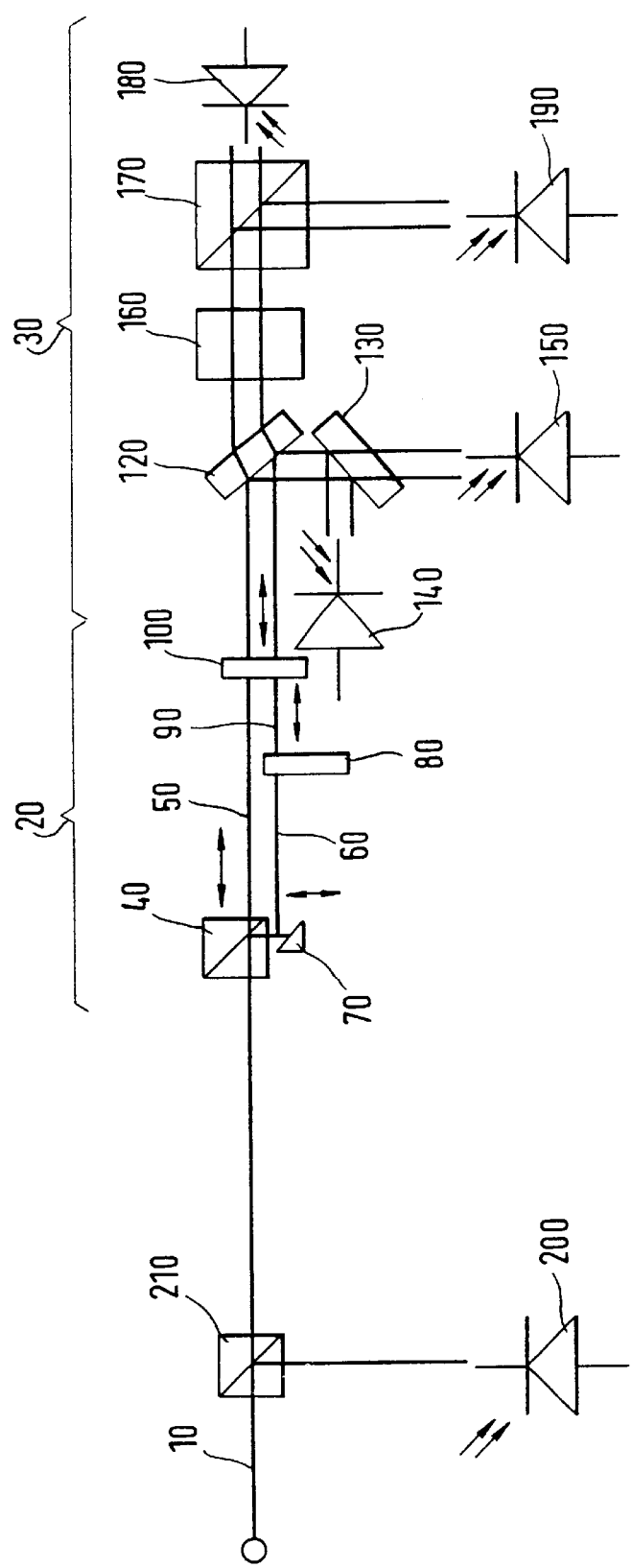

POLARIZATION CONVERTER

BACKGROUND OF THE INVENTION

The present invention relates to the conversion of the state of polarization of an optical beam.

The state of polarization of an optical beam represents an important feature in many applications, in particular when measurements comprise polarization dependent components. Polarizers are typically inserted into the optical beam in order to provide a defined state of polarization. While optical signals with defined state of polarization will pass the polarizer, optical signals with other states of polarization will generally be absorbed or reflected. Disadvantageous in that solution, however, is that the optical power of the output beam after the polarizer can be significantly decreased with respect to the input beam. Further, the optical power of the output beam becomes a function of the state of polarization of the input beam.

A polarization converter for converting randomly polarized light to linearly polarized light is known from EP-A-431894. EP-A-489375 discloses a drum servo system. In EP-A-782028, an apparatus produces parallel beams with like polarization by aid of a polarization splitter/combiner, and the parallel beams are then subject to polarization dependent processing. U.S. Pat. No. 5,102,222 discloses a light wave polarization determination using a hybrid system. A polarimeter is described in U.S. Pat. No. 6,043,887.

SUMMARY OF THE INVENTION

It is an object of the present invention to reduce dependencies of a polarization corrected output beam on the variation of polarization over time of the input beam. The object is solved by the independent claims. Preferred embodiments are shown by the dependent claims.

According to the present invention, a polarization converter comprises a polarization dependent beam splitter splitting up an incoming optical beam into a first and a second beam, each with a defined state of polarization but different from each other. Preferably, one of the beams will be polarized horizontally while the other beam will be polarized vertically. A polarization adapter is provided to the second beam of the polarization dependent beam splitter. The polarization adapter converts the state of polarization from its input to its output in a way that the states of polarization of the first beam (from the polarization dependent splitter) and the output beam from the polarization adapter substantially match.

Each one of the two beams with substantially matching states of polarization might then optionally be provided to a polarizer with substantially the same intended state of polarization, in order to correct small deviations in the states of polarization. It goes without saying that the polarization orientation of the polarizer should match with the states of polarization of its input beams in order to reduce unwanted power consumption by the polarizer.

The polarization converter according to the present invention thus provides a first output beam (as the first beam from the polarization dependent beam splitter) and a second output beam (as the output from the polarization adapter with the second beam of the polarization dependent beam splitter as input thereof). The two output beams of the polarization converter are provided with substantially the same defined state of polarization. In case that the power consumption of the polarization dependent beam splitter, the polarization adapter, and the polarizer (if used) is neglectable (dependent on the characteristics of the components as well as their correct application), which should be the case in most applications, the sum of power of the two output beams of the polarization converter substantially equals the optical power of the input beam to the polarization converter.

Dependant on the application it might be useful to avoid interference effects between the two beams from the polarization dependent beam splitter as well as between the two output beams from the polarization converter. This can be made sure in that the two beams are spatially separated from each other.

In a preferred embodiment, the two output beams from the polarization converter are provided substantially in parallel and preferably with only a small distance between the two parallel output beams. The area of further optical components subjected to the two output beams from the polarization converter is preferably designed to be sufficiently large, so that the same optical component(s) can be applied for both output beams of the polarization converter. It is also possible to use two separate detectors (instead of one larger detector) and provide(e.g., electronically) a sum of individual photo currents from the two separate detectors.

The polarization adapter preferably comprises a λ/2-plate which rotates the linear polarization by 90 degrees (and, for example, converts from parallel to perpendicular polarization).

In one embodiment, the optical power of the input is further detected in order to monitor a variation of the input power to the polarization converter. The detected input power can be used for power control purposes or to correct parasitic effects of the set-up, e.g., to calibrate the arrangement in terms of wavelength dependency of the detector response or the total set-up. This allows achieving a highest absolute power measurement accuracy.

Additional electrical circuits as well as some signal processing and related software functionality can be provided, dependent on the specific application, e.g., in order to process the signals of the detected photo currents. The invention can be partly supported by one or more suitable software programs, which can be stored on or otherwise provided by any kind of data carrier, and which might be executed in or by any suitable data processing unit. Such a program is preferably use dot provide algorithms for deriving the absolute power and wavelength information out of the individual detector signals and the calibration data.

BRIEF DESCRIPTION OF THE DRAWINGS

Other objects and many of the attendant advantages of the present invention will be readily appreciated and become better understood by reference to the following detailed description when considering in connection with the accompanied drawing.

FIG. 1 shows an application of the present invention for use in conjunction with a wavelength detection set-up.

DETAILED DESCRIPTION OF THE INVENTION

In FIG. 1, an optical input beam 10 is launched through a polarization converter 20 to a polarization dependent analysis unit 30. The polarization converter 20 comprises a polarization dependent beam splitter 40 receiving the input beam 10 and dividing the input beam 10 in a first beam 50 with a horizontal polarization and a second beam 60 with a vertical polarization. Arrows indicate the states of polarization, whereby the selected states of polarization in FIG. 1 only represent examples. The second output beam 60 is preferably redirected e.g. by a mirror 70 in a way that the first and second beams 50 and 60 are substantially parallel to each other. However, both beams 50 and 60 remain spatially separated from each other to avoid interference.

The second beam 60 is provided to a λ/2-plate 80 acting as a polarization adapter (here: polarization rotator) in order to change the second beam 60 with the vertical state of polarization into a beam 90 having a horizontal state of polarization as the first output beam 50. Thus, the beams 50 and 90 substantially match in their state of polarization and orientation (here: horizontal polarization).

In order to remove potential deviations in the states of polarization, the output beams 50 and 90 are preferably directed to a polarizer 100. In the example of FIG. 1 the polarizer 100 is a horizontal polarizer. This is optional and reduces the need for high accurate alignment of the λ/2-plate 80 in terms of rotation.

The beams 50 and 90 (with or without the optional polarizer 100) provide the outputs of the polarization converter 20 and can be launched to the polarization dependent analysis unit 30. The sum of power of both output beams 50 and 90 is substantially equal to the optical power of the input beam 10.

Since the polarization converter 20 provides two spatially separated but substantially parallel output beams 50 and 90, the polarization dependent analysis unit 30 is preferably provided in a way that the two output beams 50 and 90 can be processed together without requiring additional or separated components for each path. This can be preferably achieved in that components subjected to the parallel output beams 50 and 90 are provided with sufficiently large areas to cover both output beams 50 and 90.

In the example of FIG. 1, the polarization dependent analysis unit 30 is a wavemeter for determining the wavelength of the input beam 10. The wavemeter 30 comprises an interferometric wavelength determination unit as disclosed in detail in EP-A-875743 by the same applicant, requiring a defined state of polarization.

In the example of FIG. 1, the wavemeter 30 comprises a beam splitter 120 dividing the output beams 50 and 90 from the polarization converter 20 into beams directed towards a coarse measuring unit comprised of a beam splitter 130 having a wavelength dependent reflection and transmission characteristic. The two beams reflected by the beam splitter 130 are detected by a detector 140, while a detector 150 detects the two beams transmitted through the beam splitter 130. The detectors 140 and 150 together with a coarse analyses unit (not shown) are also part of the coarse measuring unit.

The other two beams passing through the beam splitter 120 are directed to a λ/8-plate 160, which requires a defined state of polarization. The output thereof is provided to a polarization splitter 170, and detectors 180 and 190 detect the beams derived from the polarization splitter 170.

Further details about the wavemeter 30 are described in the aforementioned EP-A-875743 and in EP-A-1099943, both by the same applicant Agilent Technologies. The teaching of both documents with respect to the wavelength determination is incorporated herein by reference. In this embodiment, the input beam of the λ/8-plate 160 should be highly linear polarized to achieve high wavelength accuracy.

Although it is clear that the sum of power of both output beams 50 and 90 of the polarization converter 20 substantially equals the power of the input beam 10, an input power monitor 200 can further be coupled to the input beam 10, e.g., by means of a beam splitter 210, in order to precisely monitor the optical input power and to control deviations thereof. Besides this, the monitor 200 could be used to correct for intrinsic loss in the polarization converter 20. This loss could be determined by the signal ratios from the monitor 200 with respect to the sum of the two monitors 140 and 150.

What is claimed is:

1. An optical measuring unit for measuring an optical property of an incoming optical beam, comprising:
   a polarization converter adapted for receiving the incoming optical beam and providing a first output beam and a second output beam thereof, which are spatially separated and have substantially matching states of polarization, and
   a polarization dependent analysis unit adapted for receiving the first and the second output beams from the polarization converter, and for measuring the optical property of both the first and the second output beams,
   wherein the polarization converter comprises:
      a polarization dependent beam splitter adapted for splitting the incoming optical beam into the first output beam of the polarization converter and into a second beam, each with a defined state of polarization but different from each other, and
      a polarization adapter adapted for receiving the second beam and for providing the second output beam of the polarization converter, wherein the state of polarization of the second output beam substantially matches with the state of polarization of the first output beam,
      wherein the first output beam and the second output beam are spatially separated from each other to avoid interference effects.

2. The optical measuring unit of claim 1, wherein the first output beam is polarized horizontally and the second beam is polarized vertically, or vice versa.

3. The optical measuring unit of claim 1, wherein the polarization adapter comprises a λ/2-plate.

4. The optical measuring unit of claim 1, further comprising a polarizer adapted for receiving both the first and second output beam and for correcting small deviations in the states of polarization between the first and second output beam.

5. The optical measuring unit of claim 1, further comprising a beam directing device adapted to provide the first and second output beam to be substantially parallel to each other.

6. The optical measuring unit of claim 1, further comprising a monitor unit for monitoring the optical power of the incoming optical beam.

7. The optical measuring unit of claim 1, wherein an area of an optical component subjected to the first and the second output beams from the polarization converter is designed to be sufficiently large to concurrently receive the first and the second output beams.

8. The optical measuring unit of claim 1, wherein said polarization dependent analysis unit determines a wavelength of said incoming optical beam.

* * * * *